(12) United States Patent
Suzuki et al.

(10) Patent No.: US 12,469,304 B2
(45) Date of Patent: Nov. 11, 2025

(54) OBJECT DETECTION DEVICE, OBJECT DETECTION METHOD, AND STORAGE MEDIUM

(71) Applicants: DENSO CORPORATION, Kariya (JP); TOYOTA JIDOSHA KABUSHIKI KAISHA, Toyota (JP)

(72) Inventors: Youhei Suzuki, Kariya (JP); Yoshiki Hayakawa, Kariya (JP); Hidenori Tanaka, Kariya (JP); Akihiro Kida, Toyota (JP); Kunihiro Sugihara, Nagakute (JP); Yutaka Hamamoto, Takahama (JP); Masumi Fukuman, Aichi-ken (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 339 days.

(21) Appl. No.: 17/658,979

(22) Filed: Apr. 12, 2022

(65) Prior Publication Data
US 2022/0237923 A1    Jul. 28, 2022

Related U.S. Application Data

(63) Continuation of application No. PCT/JP2020/038319, filed on Oct. 9, 2020.

(30) Foreign Application Priority Data

Oct. 14, 2019 (JP) .................. 2019-188278

(51) Int. Cl.
*G06V 20/58* (2022.01)
*G06T 7/269* (2017.01)
*G06T 7/73* (2017.01)

(52) U.S. Cl.
CPC .............. *G06V 20/58* (2022.01); *G06T 7/269* (2017.01); *G06T 7/73* (2017.01); *G06T 2207/30252* (2013.01)

(58) Field of Classification Search
None
See application file for complete search history.

(56) References Cited

U.S. PATENT DOCUMENTS

| | | | |
|---|---|---|---|
| 9,183,448 B2 | 11/2015 | Mizutani | |
| 2008/0089557 A1* | 4/2008 | Iwaki | G01C 3/06 382/106 |

(Continued)

FOREIGN PATENT DOCUMENTS

| | | |
|---|---|---|
| JP | 5439876 B2 | 3/2014 |
| JP | 2017-220056 A | 12/2017 |
| JP | 2018-9918 A | 1/2018 |

OTHER PUBLICATIONS

Wang, Mengmeng, et al. "Accurate and real-time 3-D tracking for the following robots by fusing vision and ultrasonar information." IEEE/ASME Transactions On Mechatronics 23.3 (2018): 997-1006. (Year: 2018).*

*Primary Examiner* — Sean M Conner
(74) *Attorney, Agent, or Firm* — Maschoff Brennan (57) ABSTRACT

An object detection device is configured to be mounted to an own vehicle to detect an object present around the own vehicle. The object detection device includes a coordinate acquisition section and an object recognition section. The coordinate acquisition section acquires position coordinates of a detection point corresponding to the object on the basis of a plurality of images captured at different positions along with movement of the own vehicle by one imaging section mounted to the own vehicle. The object recognition section recognizes the object without using position coordinates of a movement point that is a detection point corresponding to (Continued)

a moving object but using position coordinates of a stop point that is a detection point different from the movement point.

9 Claims, 4 Drawing Sheets

(56) References Cited

U.S. PATENT DOCUMENTS

| | | |
|---|---|---|
| 2009/0189783 A1 | 7/2009 | Koitabashi |
| 2014/0362193 A1* | 12/2014 | Kanetake ................ G01S 11/12 |
| | | 348/50 |
| 2015/0217765 A1* | 8/2015 | Tokoro ................. B60W 30/09 |
| | | 701/1 |
| 2016/0180176 A1 | 6/2016 | Yamamoto |
| 2020/0278681 A1* | 9/2020 | Gier ....................... G06V 20/56 |
| 2020/0292320 A1* | 9/2020 | Sakano .............. G01C 21/3602 |

* cited by examiner

OBJECT DETECTION DEVICE, OBJECT DETECTION METHOD, AND STORAGE MEDIUM

CROSS-REFERENCE TO RELATED APPLICATION

The present application is based on and claims the benefit of priority from earlier Japanese Patent Application No. 2019-188278 filed on Oct. 14, 2019, the description of which is incorporated herein by reference.

BACKGROUND OF THE INVENTION

Technical Field

The present disclosure relates to an object detection device configured to be mounted to an own vehicle to detect an object present around the own vehicle. The present disclosure also relates to an object detection method for detecting an object present around an own vehicle. The present disclosure also relates to storage medium storing an object detection program executed by the object detection device.

Related Art

An obstacle detection system is known. The obstacle detection system is provided to a vehicle that moves, and detects an obstacle behind the vehicle by using images captured by an imaging section.

SUMMARY

As an aspect of the present disclosure, an object detection device is configured to be mounted to an own vehicle to detect an object present around the own vehicle. The object detection device includes:
  a coordinate acquisition section that acquires position coordinates of a detection point corresponding to the object on the basis of a plurality of images captured at different positions along with movement of the own vehicle by one imaging section mounted to the own vehicle; and
  an object recognition section that recognizes the object without using position coordinates of a movement point that is a detection point corresponding to a moving object but using position coordinates of a stop point that is a detection point different from the movement point.

BRIEF DESCRIPTION OF THE DRAWINGS

In the accompanying drawings.

DETAILED DESCRIPTION OF THE PREFERRED EMBODIMENTS

For example, an obstacle detection system described in JP 2009-180536 A is known. The obstacle detection system is provided to a vehicle that moves, and detects an obstacle behind the vehicle by using images captured by an imaging section. A movement detection section detects the vehicle having moved for a certain distance from the position at which a first image is captured by the imaging section. An image acquisition section acquires the first image and a second image that is an image when the movement detection section detects the vehicle having moved for a certain distance, and supplies the images to an obstacle detection section. The obstacle detection section measures the distance to an object by a motion stereo method using the first and second images. In the motion stereo method, two images captured by one camera at different times and positions are used to detect the three-dimensional position of an object in the images through the principle of triangulation and detect whether the object is an obstacle.

The obstacle detection system described in JP 2009-180536 A assumes that an object to be detected is a stationary object when detecting the three-dimensional position of the object in the images through the principle of triangulation in the motion stereo method. Therefore, when the object to be detected is a moving object, the error in three-dimensional position of the object is increased. An object detection result including a large error in three-dimensional position cannot suitably be used for vehicle controls.

The present disclosure has been made in view of the circumstances and the like described above. That is, the present disclosure provides, for example, an object detection result that can suitably be used for vehicle controls.

Embodiment

Figure 1:
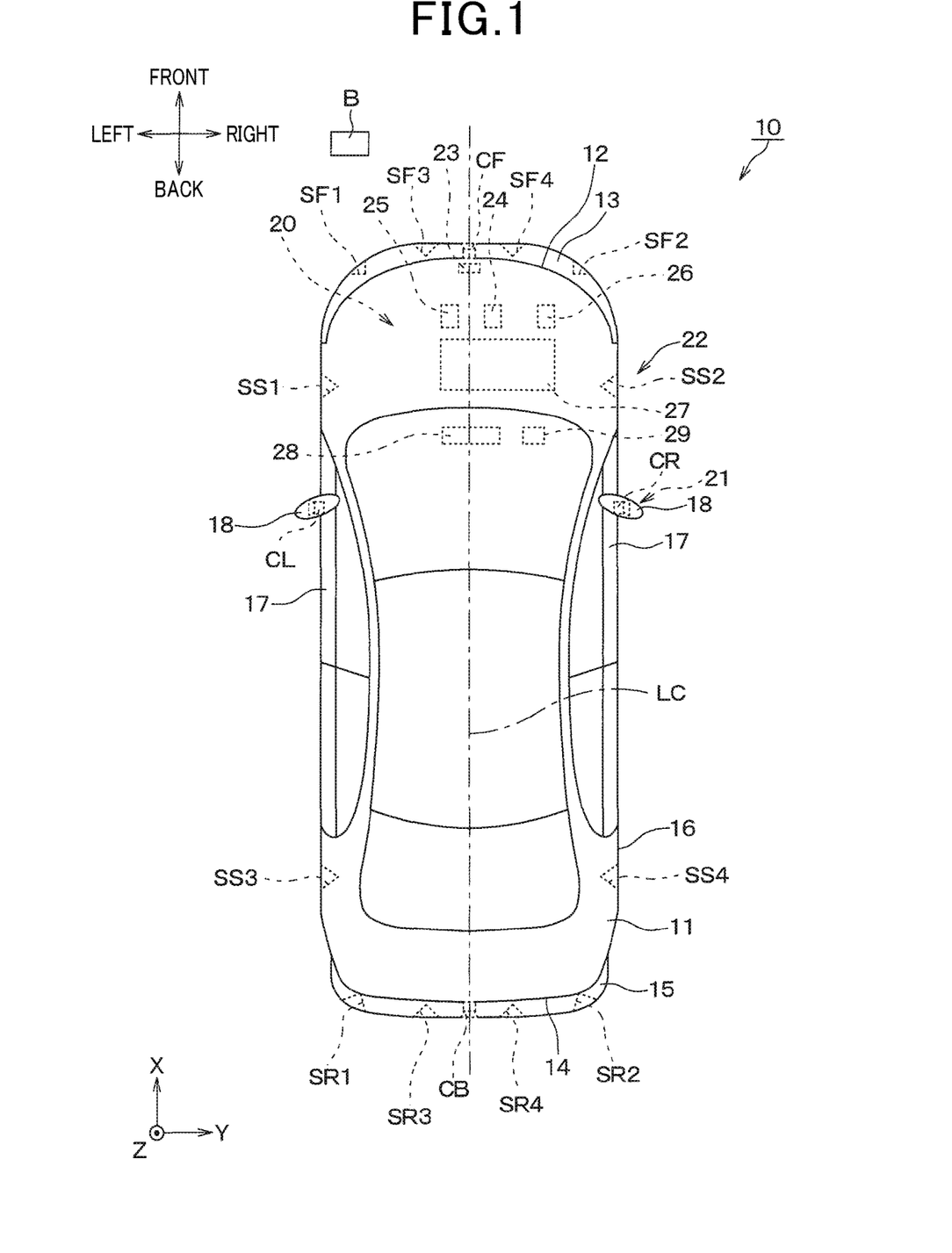
FIG. 1 is a plan view illustrating a schematic configuration of a vehicle to which an object detection device according to an embodiment is mounted.

Hereinafter, an embodiment of the present disclosure will be described with reference to the drawings. Various modified examples that are applicable to one embodiment may possibly inhibit the understanding of the embodiment if inserted in the middle of a series of descriptions about the embodiment. Therefore, modified examples are described not in the middle of a series of descriptions about the embodiment but collectively after the series of descriptions.
(Entire Configuration of Vehicle)
  With reference to FIG. 1, a vehicle 10 is a so-called four-wheel automobile and includes a vehicle body 11 having a substantially rectangular shape in plan view. Hereinafter, a virtual line that passes the center in the vehicle width direction of the vehicle 10 and is parallel with the vehicle length direction of the vehicle 10 is referred to as a vehicle central axis line LC. In FIG. 1, the vehicle width direction is a left-right direction in the drawing. The vehicle length direction is orthogonal to the vehicle width direction and the vehicle height direction. The vehicle height direction defines the vehicle height of the vehicle 10 and is parallel with a direction in which the gravity acts when the vehicle 10 is stably placed on a horizontal surface in a drivable manner. Further, any direction in which the vehicle 10 moves by drive and which is orthogonal to the vehicle height direction may be referred to as a "translational direction" of the vehicle 10.

For convenience in description, the "front", the "back", the "left", and the "right" of the vehicle 10 are defined as illustrated by arrows in FIG. 1. That is, the vehicle length direction is the same meaning as the front-back direction.

The vehicle width direction is the same meaning as the left-right direction. The vehicle height direction cannot always be parallel with the direction in which the gravity acts, depending on the conditions for placing or driving the vehicle 10. In many cases, however, the vehicle height direction is along the direction in which the gravity acts. Therefore, the "translational direction" that is orthogonal to the vehicle height direction can also be referred to as a "horizontal direction", an "in-plane direction", an "entry direction", a "travel direction", or a "track direction".

A front bumper 13 is attached to a front surface part 12 that is a front end of the vehicle body 11. A rear bumper 15 is attached to a rear surface part 14 that is a rear end of the vehicle body 11. A door panel 17 is attached to a side surface part 16 of the vehicle body 11. In the specific example illustrated in FIG. 1, two door panels each on the left and right sides, total four door panels 17 are provided. A door mirror 18 is attached to each of the door panels 17 on the front left and right sides, forming a pair.

(Object Detection Device)

An object detection device 20 is mounted to the vehicle 10. The object detection device 20 is configured to be mounted to the vehicle 10 to detect an object B present outside and around the vehicle 10. Hereinafter, the vehicle 10 to which the object detection device 20 is mounted may be abbreviated as an "own vehicle 10".

In the present embodiment, the object detection device 20 includes an imaging section 21, a sonar sensor 22, a radar sensor 23, a vehicle speed sensor 24, a shift position sensor 25, a rudder angle sensor 26, an object detection ECU 27, a display 28, and a voice output section 29. ECU is an abbreviation of Electronic Control Unit. Hereinafter, the components constituting the object detection device 20 are described in detail with reference to FIGS. 1 and 2. The electrical connection relationship among the components constituting the object detection device 20 is not illustrated in FIG. 1 to simplify the illustration.

The imaging section 21 is mounted on the own vehicle 10 so as to move with movement of the own vehicle 10 while capturing images of a region around the own vehicle 10. The imaging section 21 is configured to generate image information corresponding to the images captured of a region around the own vehicle 10. In the present embodiment, the imaging section 21 is a digital camera device and includes an image sensor such as a CCD or a CMOS. CCD is an abbreviation of Charge Coupled Device. CMOS is an abbreviation of Complementary MOS.

In the present embodiment, a plurality of imaging sections 21, i.e., a front camera CF, a rear camera CB, a left camera CL, and a right camera CR are mounted on the vehicle 10. When any of the front camera CF, the rear camera CB, the left camera CL, and the right camera CR is not specified, the expression "the imaging section 21" in a singular form or "the plurality of imaging sections 21" may be used hereinafter.

The front camera CF is attached to the front surface part 12 of the vehicle body 11 to acquire image information corresponding to an image in front of the own vehicle 10. The rear camera CB is attached to the rear surface part 14 of the vehicle body 11 to acquire image information corresponding to an image behind the own vehicle 10.

The left camera CL is attached to the door mirror 18 on the left side to acquire image information corresponding to images on the left side of the own vehicle 10. The right camera CR is attached to the door mirror 18 on the right side to acquire image information corresponding to images on the right side of the own vehicle 10.

Each of the plurality of imaging sections 21 is connected via an in-vehicle communication line to the object detection ECU 27 to enable information communication. That is, each of the plurality of imaging sections 21 is configured to output the acquired, i.e., generated image information in such a manner as to enable the object detection ECU 27 to receive the image information.

The sonar sensor 22 is a ranging sensor that detects the distance to the object B and is attached to the vehicle body 11. In the present embodiment, the sonar sensor 22 is a so-called ultrasonic sensor and is configured to be capable of transmitting exploratory waves that is ultrasonic waves toward the exterior of the own vehicle 10 and receiving reception waves including ultrasonic waves. That is, the sonar sensor 22 is provided to receive reception waves including reflected waves generated by exploratory waves being reflected on the object B and thereby output ranging information as a result of detecting the distance to a ranging point on the object B. The "ranging point" is a point which is on a surface of the object B and at which exploratory waves transmitted from the sonar sensor 22 are presumed to have been reflected, and is a point corresponding to a "reflection point" for the radar sensor 23.

The object detection device 20 includes at least one sonar sensor 22. Specifically, a plurality of sonar sensors 22 are provided in the present embodiment. Each of the plurality of sonar sensors 22 is disposed such that it is shifted to either one side from the vehicle central axis line LC in the vehicle width direction. At least one of the plurality of sonar sensors 22 is disposed to transmit exploratory waves along directions crossing the vehicle central axis line LC.

Specifically, the sonar sensors 22, i.e., a first front sonar SF1, a second front sonar SF2, a third front sonar SF3, and a fourth front sonar SF4 are attached to the front bumper 13. Similarly, the sonar sensors 22, i.e., a first rear sonar SR1, a second rear sonar SR2, a third rear sonar SR3, and a fourth rear sonar SR4 are attached to the rear bumper 15. Further, the sonar sensors 22, i.e., a first side sonar SS1, a second side sonar SS2, a third side sonar SS3, and a fourth side sonar SS4 are attached to the side surface parts 16 of the vehicle 11.

When any of the first front sonar SF1, the second front sonar SF2, the third front sonar SF3, the fourth front sonar SF4, the first rear sonar SR1, the second rear sonar SR2, the third rear sonar SR3, the fourth rear sonar SR4, the first side sonar SS1, the second side sonar SS2, the third side sonar SS3, and the fourth side sonar SS4 is not specified, the expression "the sonar sensor 22" in a singular form or "the plurality of sonar sensors 22" may be used hereinafter.

With one sonar sensor 22 referred to as a "first sonar sensor", and another sonar sensor 22 as a "second sonar sensor", a "direct wave" and an "indirect wave" are defined as below. The "direct wave" refers to a reception wave received by the first sonar sensor and attributed to a reflected wave generated when an exploratory wave transmitted from the first sonar sensor is reflected on the object B. That is, the direct wave is a reception wave when the sonar sensor 22 that sends an exploratory wave is identical with the sonar sensor 22 that detects, as the reception wave, a reflected wave generated by the exploratory wave being reflected on the object B. In contrast, the "indirect wave" refers to a reception wave received by the second sonar sensor and attributed to a reflected wave generated when an exploratory wave transmitted from the first sonar sensor is reflected on the object B. That is, the indirect wave is a reception wave when the sonar sensor 22 that sends an exploratory wave is different from the sonar sensor 22 that detects, as the reception wave, a reflected wave generated by the exploratory wave being reflected on the object B.

The first front sonar SF1 is provided at a left end on the front surface of the front bumper 13 to transmit exploratory waves toward the front left of the own vehicle 10. The second front sonar SF2 is provided at a right end on the front surface of the front bumper 13 to transmit exploratory waves toward the front right of the own vehicle 10. The first front sonar SF1 and the second front sonar SF2 are symmetrically disposed across the vehicle central axis line LC.

The third front sonar SF3 and the fourth front sonar SF4 are arranged along the vehicle width direction at positions closer to the center on the front surface of the front bumper 13. The third front sonar SF3 is disposed between the first front sonar SF1 and the vehicle central axis line LC in the vehicle width direction to transmit exploratory waves substantially toward the front of the own vehicle 10. The fourth front sonar SF4 is disposed between the second front sonar SF2 and the vehicle central axis line LC in the vehicle width direction to transmit exploratory waves substantially toward the front of the own vehicle 10. The third front sonar SF3 and the fourth front sonar SF4 are symmetrically disposed across the vehicle central axis line LC.

As described above, the first front sonar SF1 and the third front sonar SF3 that are attached on the left side of the vehicle body 11 are disposed at positions different from each other in plan view. The first front sonar SF1 and the third front sonar SF3 adjacent to each other in the vehicle width direction are provided in such a positional relationship that one of the sonars transmits exploratory waves and the other sonar can receive, as reception waves, reflected waves generated by the exploratory waves being reflected on the object B.

That is, the first front sonar SF1 is disposed to be capable of receiving both direct waves corresponding to exploratory waves transmitted by itself and indirect waves corresponding to exploratory waves transmitted by the third front sonar SF3. Similarly, the third front sonar SF3 is disposed to be capable of receiving both direct waves corresponding to exploratory waves transmitted by itself and indirect waves corresponding to exploratory waves transmitted by the first front sonar SF1.

Similarly, the third front sonar SF3 and the fourth front sonar SF4 that are attached closer to the center in the vehicle width direction of the vehicle body 11 are disposed at positions different from each other in plan view. The third front sonar SF3 and the fourth front sonar SF4 that are adjacent to each other in the vehicle width direction are provided in such a positional relationship that one of the sonars transmits exploratory waves and the other sonar can receive, as reception waves, reflected waves generated by the exploratory waves being reflected on the object B.

Similarly, the second front sonar SF2 and the fourth front sonar SF4 that are attached on the right side of the vehicle body 11 are disposed at positions different from each other in plan view. The second front sonar SF2 and the fourth front sonar SF4 that are adjacent to each other in the vehicle width direction are provided in such a positional relationship that one of the sonars transmits exploratory waves and the other sonar can receive, as reception waves, reflected waves generated by the exploratory waves being reflected on the object B.

The first rear sonar SR1 is provided at a left end on the rear surface of the rear bumper 15 to transmit exploratory waves toward the rear left of the own vehicle 10. The second rear sonar SR2 is provided at a right end on the rear surface of the rear bumper 15 to transmit exploratory waves toward the rear right of the own vehicle 10. The first rear sonar SR1 and the second rear sonar SR2 are symmetrically disposed across the vehicle central axis line LC.

The third rear sonar SR3 and the fourth rear sonar SR4 are arranged along the vehicle width direction at positions closer to the center on the rear surface of the rear bumper 15. The third rear sonar SR3 is disposed between the first rear sonar SR1 and the vehicle central axis line LC in the vehicle width direction to transmit exploratory waves substantially toward the rear of the own vehicle 10. The fourth rear sonar SR4 is disposed between the second rear sonar SR2 and the vehicle central axis line LC in the vehicle width direction to transmit exploratory waves substantially toward the rear of the own vehicle 10. The third rear sonar SR3 and the fourth rear sonar SR4 are symmetrically disposed across the vehicle central axis line LC.

As described above, the first rear sonar SR1 and the third rear sonar SR3 that are attached on the left side of the vehicle body 11 are disposed at positions different from each other in plan view. The first rear sonar SR1 and the third rear sonar SR3 that are adjacent to each other in the vehicle width direction are provided in such a positional relationship that one of the sonars transmits exploratory waves and the other sonar can receive, as reception waves, reflected waves generated by the exploratory waves being reflected on the object B.

That is, the first rear sonar SR1 is disposed to be capable of receiving both direct waves corresponding to exploratory waves transmitted by itself and indirect waves corresponding to exploratory waves transmitted by the third rear sonar SR3. Similarly, the third rear sonar SR3 is disposed to be capable of receiving both direct waves corresponding to exploratory waves transmitted by itself and indirect waves corresponding to exploratory waves transmitted by the first rear sonar SR1.

Similarly, the third rear sonar SR3 and the fourth rear sonar SR4 that are attached closer to the center in the vehicle width direction of the vehicle body 11 are disposed at positions different from each other in plan view. The third rear sonar SR3 and the fourth rear sonar SR4 that are adjacent to each other in the vehicle width direction are provided in such a positional relationship that one of the sonars transmits exploratory waves and the other sonar can receive, as reception waves, reflected waves generated by the exploratory waves being reflected on the object B.

Similarly, the second rear sonar SR2 and the fourth rear sonar SR4 that are attached on the right side of the vehicle body 11 are disposed at positions different from each other in plan view. The second rear sonar SR2 and the fourth rear sonar SR4 that are adjacent to each other in the vehicle width direction are provided in such a positional relationship that one of the sonars transmits exploratory waves and the other sonar can receive, as reception waves, reflected waves generated by the exploratory waves being reflected on the object B.

The first side sonar SS1, the second side sonar SS2, the third side sonar SS3, and the fourth side sonar SS4 are provided to laterally transmit exploratory waves from vehicle side surfaces that are outer surfaces of the side surface parts 16. Each of the first side sonar SS1, the second side sonar SS2, the third side sonar SS3, and the fourth side sonar SS4 is provided to be capable of receiving only direct waves.

The first side sonar SS1 is disposed between the door mirror 18 on the left side and the first front sonar SF1 in the front-back direction to transmit exploratory waves toward the left of the own vehicle 10. The second side sonar SS2 is disposed between the door mirror 18 on the right side and the second front sonar SF2 in the front-back direction to transmit exploratory waves toward the right of the own vehicle 10. The first side sonar SS1 and the second side sonar SS2 are symmetrically provided across the vehicle central axis line LC.

The third side sonar SS3 is disposed between the door panel 17 on the rear left side and the first rear sonar SR1 in the front-back direction to transmit exploratory waves toward the left of the own vehicle 10. The fourth side sonar SS4 is disposed between the door panel 17 on the rear right side and the second rear sonar SR2 in the front-back direction to transmit exploratory waves toward the right of the own vehicle 10. The third side sonar SS3 and the fourth side sonar SS4 are symmetrically provided across the vehicle central axis line LC.

Each of the plurality of sonar sensors 22 is connected via an in-vehicle communication line to the object detection ECU 27 to enable information communication. Each of the plurality of sonar sensors 22 transmits exploratory waves under control of the object detection ECU 27, generates a signal corresponding to the reception result of reception waves, and outputs the signal in such a manner as to enable the object detection ECU 27 to receive the signal. The information included in the signal corresponding to the reception result of reception waves is referred to as "ranging information" hereinafter. The ranging information includes information on the reception intensity of reception waves and distance information. The "distance information" is information on the distance between each of the plurality of sonar sensors 22 and the object B. Specifically, the distance information includes, for example, information on a time lag from the transmittance of exploratory waves to the reception of reception waves.

The radar sensor 23 is a laser radar sensor or a millimeter-wave radar sensor that transmits and receives radar waves and is attached to the front surface part 12 of the vehicle body 11. The radar sensor 23 is connected via an in-vehicle communication line to the object detection ECU 27 to enable information communication. The radar sensor 23 is configured to generate a signal corresponding to the position and a relative velocity of a reflection point and output the signal in such a manner as to enable the object detection ECU 27 to receive the signal. The "reflection point" is a point which is on a surface of the object B and at which radar waves are presumed to have been reflected. The "relative velocity" is a velocity of the reflection point, i.e., the object B on which radar waves have been reflected, relative to the own vehicle 10.

The vehicle speed sensor 24, the shift position sensor 25, and the rudder angle sensor 26 are connected via an in-vehicle communication line to the object detection ECU 27 to enable information communication. The vehicle speed sensor 24 is provided to generate a signal corresponding to a travel velocity of the own vehicle 10 and output the signal in such a manner as to enable the object detection ECU 27 to receive the signal. The travel velocity of the own vehicle 10 is simply referred to as "vehicle speed" hereinafter. The shift position sensor 25 is provided so to generate a signal corresponding to a shift position of the own vehicle 10 and output the signal in such a manner as to enable the object detection ECU 27 to receive the signal. The rudder angle sensor 26 is provided so to generate a signal corresponding to a steering angle of the own vehicle 10 and output the signal in such a manner as to enable the object detection ECU 27 to receive the signal.

The object detection ECU 27 is disposed inside the vehicle body 11. The object detection ECU 27 is a so-called in-vehicle microcomputer, and includes a CPU, a ROM, a RAM, a non-volatile rewritable memory, and the like. Examples of the non-volatile rewritable memory include an EEPROM, a flash ROM, and a hard disk. EEPROM is an abbreviation of Electronically Erasable and Programmable Read Only Memory. The CPU, the ROM, the RAM, and the non-volatile rewritable memory of the object detection ECU 27 are hereinafter simply abbreviated as a "CPU", a "ROM", a RAM", and a "non-volatile storage medium", respectively. The ROM and the non-volatile storage medium each correspond to a computer-readable non-transitory tangible storage medium.

The object detection ECU 27 is configured to be capable of realizing various control actions by the CPU reading a program from the ROM or the non-volatile storage medium and executing the program. This program includes something corresponding to a flow chart or routine described later. The RAM and the non-volatile storage medium are configured to be capable of temporarily storing processing data when the CPU executes the program. In addition, the ROM and/or the non-volatile storage medium preliminarily stores various types of data used when the program is executed. Examples of the various types of data include an initial value, a look-up table, and a map.

The object detection ECU 27 is configured to execute an object detection action on the basis of the signals and the information received from each of the plurality of imaging sections 21, the vehicle speed sensor 24, the shift position sensor 25, the rudder angle sensor 26, and the like. The object detection ECU 27 is also configured to control the actions of the display 28 and the voice output section 29 to perform a notifying action accompanying an object detection state.

The display 28 and the voice output section 29 are disposed in a passenger compartment of the vehicle 10. The display 28 and the voice output section 29 are connected via an in-vehicle communication line to the object detection ECU 27 to enable information communication. That is, the display 28 is configured to display an object detection result and a notifying action accompanying various actions based on the object detection result on a display screen or an indicator. The voice output section 29 is configured to output an object detection result and a notifying action accompanying various actions based on the object detection result by voice output from a speaker.

In the present embodiment, the object detection ECU 27 is configured to exhibit drive support functions including a parking support function and a collision avoidance function. Specifically, the object detection ECU 27 is configured to, for example, detect a parking space by using the imaging section 21 and support the movement of the own vehicle 10 into the detected parking space on the basis of an obstacle detection result of the sonar sensor 22 and the like. The "obstacle" refers to, among objects B present around the own vehicle 10, an object which has a value of height greater than a prescribed threshold and which therefore the own vehicle has difficulty in passing over or it is impossible for the own vehicle to pass over. The object detection ECU 27 is also configured to calculate an acceleration and deceleration control amount and a steering control amount of the own vehicle 10 necessary for traveling a prescribed calculated route while avoiding an obstacle detected using the imaging section 21.

That is, the object detection device 20 is provided to constitute a part of a drive support apparatus 50. The drive support apparatus 50 includes, in addition to the object detection device 20, an input operation section 51, a power control ECU 52, a braking control ECU 53, and a steering control ECU 54. The input operation section 51, the power control ECU 52, the braking control ECU 53, and the steering control ECU 54 are connected via an in-vehicle communication line to the object detection ECU 27 to enable information communication.

The input operation section 51 is disposed in the passenger compartment of the vehicle 10. The input operation section 51 includes switches and/or a voice input section for receiving an input operation by an operator that is an occupant of the vehicle 10.

The power control ECU 52 is provided to control the action of a drive motor and/or an engine (both not illustrated) and thus control the drive output of the vehicle 10. The braking control ECU 53 is provided to control the drive of a brake actuator (not illustrated) or the like and thus control the braking force of the vehicle 10. The steering control ECU 54 is provided to control the drive of a steering motor (not illustrated) and thus control the steering amount of the vehicle 10.

(Object Detection ECU)

Figure 2:
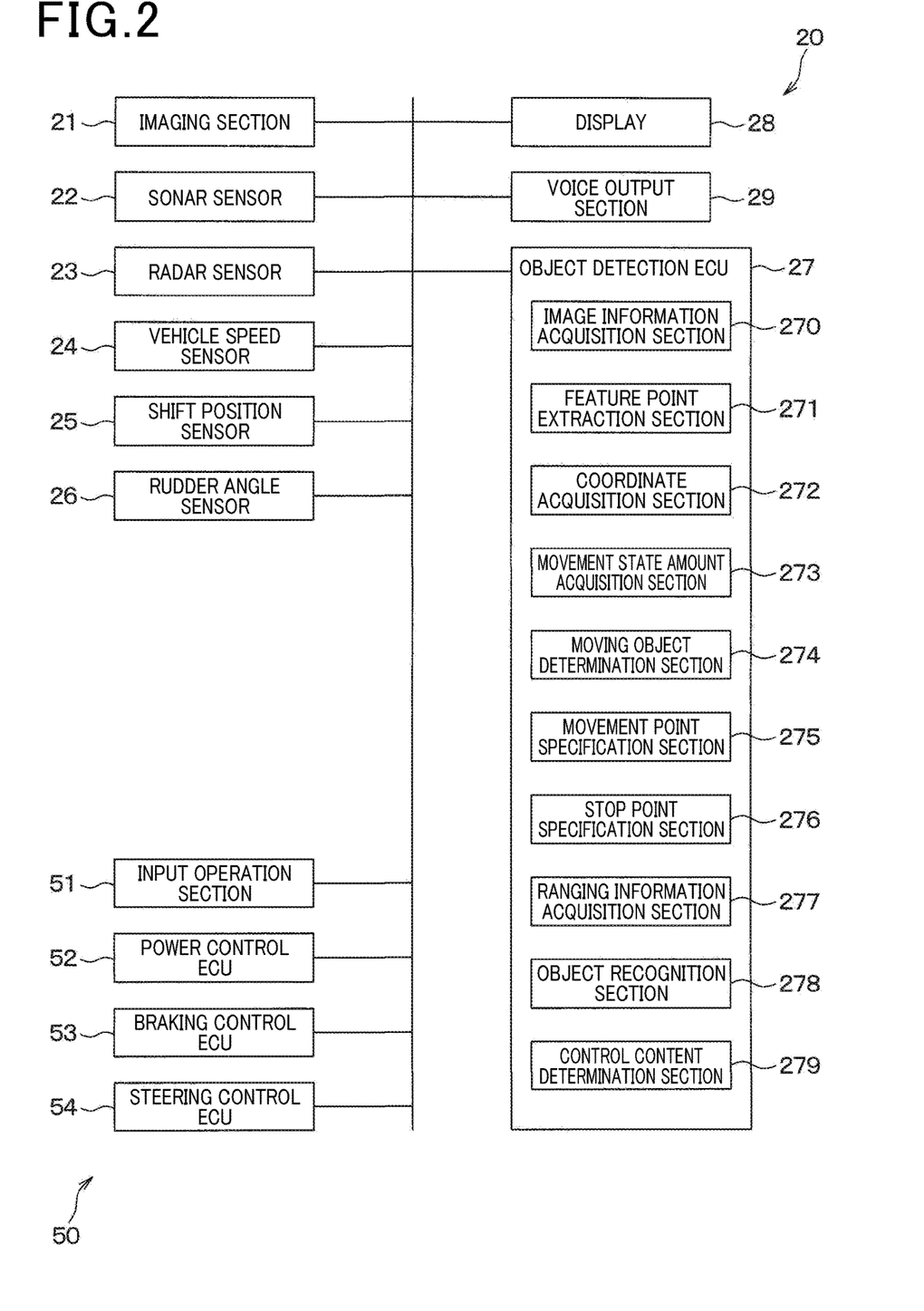
FIG. 2 is a block diagram illustrating a schematic functional configuration in one embodiment of the object detection device illustrated in FIG. 1.

With reference to FIG. 2, the object detection ECU 27 has the following functional configuration realized on a microcomputer. That is, the object detection ECU 27 includes an image information acquisition section 270, a feature point extraction section 271, and a coordinate acquisition section 272. The object detection ECU 27 also includes a movement state amount acquisition section 273, a moving object determination section 274, a movement point specification section 275, and a stop point specification section 276. The object detection ECU 27 also includes a ranging information acquisition section 277, an object recognition section 278, and a control content determination section 279. Hereinafter, the functional configuration of the object detection ECU 27 in the present embodiment will be described in detail.

The image information acquisition section 270 is provided to acquire image information corresponding to an image captured of a region around the own vehicle 10. Specifically, the image information acquisition section 270 is configured to receive from the imaging section 21 image information generated by the imaging section 21 and chronologically hold in the non-volatile storage medium a prescribed volume of the received image information.

The feature point extraction section 271 is provided to extract feature points on the captured image on the basis of the image information acquired by the image information acquisition section 270. The feature points are points featuring the shape of the object B in the captured image and correspond to "detection points". Specifically, the feature points are discriminative points i.e., pixels in the angle of view of the captured image. For example, the feature points are pixels having a brightness greatly changed from that of a pixel adjacent thereto. The feature points and the technique for extracting the feature points are well-known at the time of filing of the present application. As the technique for detecting the feature points, a well-known technique (such as a Sobel filter, a Laplacian filter, and a Canny method) can be used. Accordingly, the technique for extracting the feature points by the feature point extraction section 271 is not described in detail in the present specification. The "extraction" of the feature points can also be expressed as "detection".

The coordinate acquisition section 272 is provided to acquire the position coordinates of a detection point corresponding to the object B on the basis of a plurality of images captured at different positions of the own vehicle by one imaging section 21 mounted on the own vehicle 10. The "one imaging section 21" is, for example, the front camera CF when the object B present in front of the own vehicle 10 is detected.

Specifically, the coordinate acquisition section 272 is configured to calculate the three-dimensional position coordinates of a feature point corresponding to the object B by a motion stereo technique on the basis of a plurality of images captured at different positions of the own vehicle and different times by an identical imaging section 21. The motion stereo is also referred to as monocular motion stereo or SFM. SFM is an abbreviation of Structure from Motion. The motion stereo or the SFM has been publicly known or well-known at the time of filing of the present application. Accordingly, the motion stereo or the SFM is not described in detail in the present specification.

The "detection point" corresponding to the object B, the position coordinates of which are calculated by the coordinate acquisition section 272, is, among feature points extracted by the feature point extraction section 271, a feature point associated with each of the plurality of images captured at different positions of the own vehicle and different times. Therefore, the "detection point" can also be said as a "feature point".

The movement state amount acquisition section 273 is provided to acquire a movement state amount as a movement velocity or a movement distance of the object B. In the present embodiment, the movement state amount acquisition section 273 is configured to acquire a movement state amount by using an optical flow calculated on the basis of the plurality of images captured at different positions of the own vehicle.

The moving object determination section 274 is provided to determine the presence or absence of a moving object that is the object B in a motion state, and the relative positional relationship between the moving object (when present) and the own vehicle 10, on the basis of the result of acquiring the movement state amount by the movement state amount acquisition section 273. Specifically, the moving object determination section 274 is configured to determine the presence or absence of a moving object on the basis of a detection state and a distribution state of detection points having a value of the movement state amount greater than a threshold. The moving object determination section 274 is also configured to determine the direction in which a moving object is present with respect to the own vehicle 10, on the basis of the three-dimensional position or the position in the angle of view of a detection point determined not to be noise but to correspond to the moving object. The detection of a moving object and the calculation of the movement state amount using the optical flow have been publicly known or well-known at the time of filing of the present application. Accordingly, the detection of a moving object and the calculation of the movement state amount using the optical flow are not described in detail in the present specification.

Figure 3:
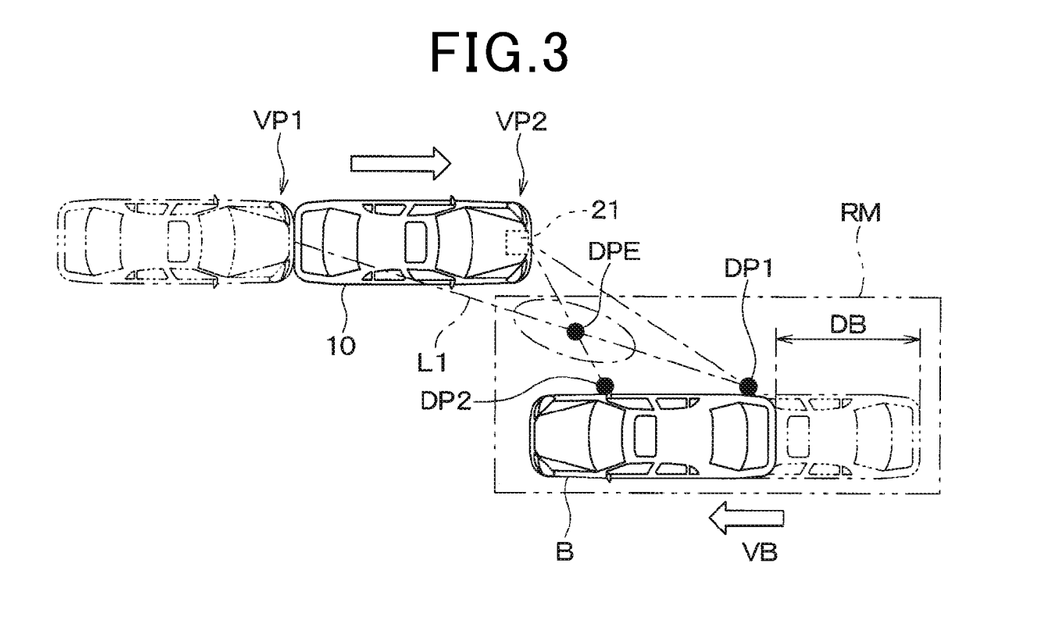
FIG. 3 is a schematic diagram illustrating an example of actions of the object detection device illustrated in FIG. 2.

The movement point specification section 275 is provided to specify a detection point corresponding to a moving object as a movement point. With reference to FIG. 3 in addition to FIGS. 1 and 2, in the present embodiment, the movement point specification section 275 is configured to specify, as a movement point, a detection point present in a movement point specification range RM that is a prescribed range set according to the relative positional relationship between a moving object and the own vehicle 10. Specifically, the movement point specification section 275 is configured to set the movement point specification range RM in the direction in which a moving object is present with respect to the own vehicle 10.

The movement point specification section 275 is also configured to variably set the shape of the movement point specification range RM according to the movement state amount. Specifically, the movement point specification section 275 is configured to change the size of the movement point specification range RM according to a movement velocity VB of a moving object or a movement distance DB of a moving object between the previous imaging point and the present imaging point. Aspects of setting the movement point specification range RM will be described in detail in the section of Summary of actions below.

The stop point specification section 276 is provided to specify a stop point that is a detection point different from the movement point. The stop point is a detection point corresponding to a stationary object that is the object B in a stationary state. The stop point specification section 276 is configured to remove the movement point from a plurality of acquired detection points to specify a stop point. Specifically, the stop point specification section 276 is configured to remove the movement point from a plurality of detection points, the position coordinates of which are acquired by the coordinate acquisition section 272, to specify a stop point.

The ranging information acquisition section 277 is provided to acquire ranging information that is a result of detecting the distance by the sonar sensor 22. The ranging information acquisition section 277 is provided to also acquire information on a relative position of the object B with respect to the own vehicle 10 in the translational direction by triangulation based on the ranging information acquired using the plurality of sonar sensors 22. The ranging information acquisition section 277 is also configured to chronologically hold, in the non-volatile storage medium, the acquired result including the ranging information and the relative position information in a volume corresponding to a prescribed time duration.

The object recognition section 278 is provided to recognize the object B on the basis of the position coordinates of a detection point acquired by the coordinate acquisition section 272. Specifically, the object recognition section 278 is configured to recognize the relative position of the object B with respect to the own vehicle 10 and the three-dimensional shape of the object B on the basis of the positions of detection points corresponding to the object B in an XYZ three-dimensional coordinate system set with reference to a prescribed origin. The "prescribed origin" is, for example, the position of the front camera CF at a prescribed reference time point. The "prescribed reference time point" is, for example, a time point when an object detection action is started by the object detection device 20. The XYZ three-dimensional coordinate system is, for example, a rectangular coordinate system with reference to the prescribed origin at the prescribed reference time point, with the front set to the X-axis positive direction, the Y-axis positive direction set parallel with the vehicle width direction, and the Z-axis positive direction set parallel with the vehicle height direction.

In the present embodiment, the object recognition section 278 is provided to recognize the object B without using the position coordinates of the movement point but using the position coordinates of the stop point. Specifically, the object recognition section 278 is configured to recognize the object B on the basis of the position coordinates of the stop point obtained by removing the coordinates of the movement point from the position coordinates of a plurality of detection points acquired by the coordinate acquisition section 272.

The object recognition section 278 is provided to recognize the object B on the basis of the result of calculating the position coordinates by the coordinate acquisition section 272 and the ranging information and the relative position information acquired by the ranging information acquisition section 277. That is, in the present embodiment, the object recognition section 278 is configured to detect the object B as an obstacle, using a so-called "sensor fusion" technique that fuses an image recognition result with a ranging result. Specifically, the object recognition section 278 is configured to correct the result of calculating the position coordinates by the coordinate acquisition section 272 on the basis of the ranging information and the relative position information acquired by the ranging information acquisition section 277, to recognize the position of the object B in the XYZ three-dimensional coordinate system and the shape of the object B.

The control content determination section 279 is configured to determine the control contents on the basis of the result of acquiring the ranging information and the relative position information by the ranging information acquisition section 277 and the result of recognizing the object B by the object recognition section 278. The "control contents" are an acceleration and deceleration control amount and a steering control amount of the own vehicle 10 that are necessary for traveling a prescribed calculated route while avoiding the object B according to the detection result of the object B. The control content determination section 279 is also configured to send the determined control contents via an in-vehicle communication line to the power control ECU 52, the braking control ECU 53, and the steering control ECU 54.

(Summary of Actions)

Hereinafter, the summary of actions of the object detection device 20 according to the present embodiment, that is, the object detection ECU 27 will be described together with the effects exhibited by the configuration of the present embodiment.

Each of the plurality of imaging sections 21, i.e., the front camera CF, the rear camera CB, the left camera CL, and the right camera CR captures images of a region around the own vehicle 10 and generates image information corresponding the captured images. Each of the plurality of imaging sections 21 also outputs the generated image information in such a manner as to enable the object detection ECU 27 to receive the image information.

Each of the plurality of sonar sensors 22 receives reception waves including reflected waves of exploratory waves transmitted toward the exterior of the own vehicle 10 to measure the distance to a point on the object B present around the own vehicle 10. Each of the plurality of sonar sensors 22 also outputs the acquired ranging information in such a manner as to enable the object detection ECU 27 to receive the ranging information.

The radar sensor 23 generates a signal corresponding to the position and a relative velocity of a reflection point on the object B and outputs the signal in such a manner as to enable the object detection ECU 27 to receive the signal. The vehicle speed sensor 24 generates a signal corresponding to a vehicle speed and outputs the signal in such a manner as to enable the object detection ECU 27 to receive the signal. The shift position sensor 25 generates a signal corresponding to a shift position of the own vehicle 10 and outputs the signal in such a manner as to enable the object detection ECU 27 to receive the signal. The rudder angle sensor 26 generates a signal corresponding to a steering angle of the own vehicle 10 and outputs the signal in such a manner as to enable the object detection ECU 27 to receive the signal.

The object detection ECU 27 receives the image information from each of the plurality of imaging sections 21. The object detection ECU 27 also receives the ranging information from each of the plurality of sonar sensors 22. The object detection ECU 27 also receives the output signals from the radar sensor 23, the vehicle speed sensor 24, the shift position sensor 25, and the rudder angle sensor 26. The object detection ECU 27 executes an object detection action and a drive support action on the basis of the signals and information received from each of the plurality of sonar sensors 22, each of the plurality of imaging sections 21, the vehicle speed sensor 24, the shift position sensor 25, the rudder angle sensor 26, and the like.

The image information acquisition section 270 acquires image information corresponding to an image captured of a region around the own vehicle 10 from each of the plurality of imaging sections 21. The acquired image information is chronologically stored in the non-volatile storage medium. The feature point extraction section 271 extracts feature points on the captured image on the basis of the image information acquired by the image information acquisition section 270. The coordinate acquisition section 272 acquires the position coordinates of a detection point corresponding to the object B on the basis of a plurality of images captured at different positions along with movement of the own vehicle 10 by one imaging section 21.

Specifically, for example, in cases of detecting the object B present in front of the own vehicle 10, the image information acquisition section 270 acquires image information corresponding to images captured by the front camera CF and chronologically holds a prescribed volume of the received image information. The coordinate acquisition section 272 calculates, by a motion stereo technique, the position coordinates, i.e., the three-dimensional coordinates, of a feature point that is extracted from images captured by the front camera CF and corresponds to the object B.

The movement state amount acquisition section 273 acquires a movement state amount of the object B. Specifically, in the example described above, the movement state amount acquisition section 273 acquires a movement state amount corresponding to the object B in front of the own vehicle 10 by using an optical flow calculated on the basis of the plurality of images captured by the front camera CF.

The moving object determination section 274 determines the presence or absence of a moving object that is the object B in a motion state, and the relative positional relationship between the moving object (when present) and the own vehicle 10, on the basis of the result of acquiring the movement state amount by the movement state amount acquisition section 273. Specifically, the moving object determination section 274 determines the direction in which a moving object is present with respect to the own vehicle 10, on the basis of the three-dimensional position or the position in the angle of view of a detection point determined not to be noise but to correspond to the moving object.

The movement point specification section 275 specifies a detection point corresponding to a moving object as a movement point. Specifically, with reference to FIG. 3, first, the movement point specification section 275 sets a first feature point DP1 on the object B that has been detected at a previous own vehicle position VP1, to a reference point of a movement point specification range RM. The previous own vehicle position VP1 is a time point when an image of a region in front of the own vehicle 10 is captured by the front camera CF immediately before a present own vehicle position VP2. Next, the movement point specification section 275 sets the movement point specification range RM with reference to the reference point. In FIG. 3, the movement point specification range RM is set as a rectangle having the reference point in the center thereof. The movement point specification range RM, however, is not limited to this example, and may be set to have a larger area in the travel direction of the object B and on the own-vehicle side. Specifically, as described later, an area in the travel direction of the object B and on the own-vehicle side likely generates a calculation error. Therefore, the movement point specification range RM may be set to be capable of covering such an area. The movement point specification section 275 specifies a detection point present in the movement point specification range RM as a movement point. Setting of the reference point is not limited to the example described above. For example, the center of gravity (or the center) of the area of the object B detected by the front camera CF at the previous own vehicle position VP1 may be used as the reference point.

When the object B is a stationary object, the position of the first feature point DP 1 is not changed between the previous own vehicle position VP1 and the present own vehicle position VP2. The object B that moves at a movement velocity VB, however, moves the first feature point DP1 to a second feature point DP2.

Here, the calculation of the position coordinates by motion stereo such as SFM is performed on the assumption that the object B to be calculated is a stationary object. Therefore, calculating the position coordinates of a moving object by the motion stereo increases the calculation error. Particularly, when the detection point, i.e., the feature point, moves along an epipolar line, the calculation error is considerably increased. In addition, the calculation error is increased as the movement velocity VB or the movement distance DB of the moving object is increased. In the example illustrated in FIG. 3, the result of calculating the position coordinates is generated in a range surrounded by the dash-dotted line of an ellipse in the drawing which is formed with a detection error candidate point DPE in the center of the ellipse. The detection error candidate point DPE is generated on a virtual line L1 connecting the position of the front camera CF at the previous own vehicle position VP1 and the first feature point DP1.

Therefore, the movement point specification section 275 determines the size of the movement point specification range RM according to the movement velocity VB or the movement distance DB of the moving object. Specifically, the movement point specification section 275 sets the size of the movement point specification range RM larger as the movement velocity VB or the movement distance DB of the moving object is increased. Subsequently, the movement point specification section 275 determines the relative position of the movement point specification range RM with respect to the reference point according to the relative velocity between the own vehicle 10 and the moving object. This procedure enables the movement point specification section 275 to set the movement point specification range RM in the direction in which the moving object is present with respect to the own vehicle 10.

Referring back to FIG. 2, a stop point specification section 276 specifies a stop point that is a detection point different from the movement point. Specifically, the stop point specification section 276 removes the movement point from a plurality of detection points acquired by the feature point extraction section 271 and the coordinate acquisition section 272 to specify a stop point. In more detail, the stop point specification section 276 removes the movement point from a plurality of detection points, the position coordinates of which are acquired by the coordinate acquisition section 272, to specify a stop point.

The ranging information acquisition section 277 acquires ranging information corresponding to the object B from each of the plurality of sonar sensors 22. The ranging information acquisition section 277 also acquires information on a relative position of the object B with respect to the own vehicle 10 on the basis of the ranging information. The ranging information acquisition section 277 chronologically holds the acquired result including the ranging information and the relative position information in a volume corresponding to a prescribed time duration.

The object recognition section 278 recognizes the object B on the basis of the result of calculating the position coordinates by the coordinate acquisition section 272 and the ranging information and the relative position information acquired by the ranging information acquisition section 277. The control content determination section 279 determines the control contents on the basis of the result of acquiring the ranging information and the relative position information by the ranging information acquisition section 277 and the result of recognizing the object B by the object recognition section 278. The control content determination section 279 sends the determined control contents via an in-vehicle communication line to the power control ECU 52, the braking control ECU 53, and the steering control ECU 54.

The object detection device 20 according to the present embodiment, and an object detection method and an object detection program that are executed by the object detection device can exhibit the following effects. Hereinafter, the object detection device 20 according to the present embodiment, and an object detection method and an object detection program that are executed by the object detection device are collectively and simply referred to as the "present embodiment".

In the present embodiment, the object recognition section 278 recognizes the object B present around the own vehicle 10 by a motion stereo technique without using the position coordinates of a movement point that is a detection point corresponding to a moving object but using the position coordinates of a stop point. Specifically, the object recognition section 278 recognizes the object B present around the own vehicle 10 on the basis of the position coordinates of a stop point specified by removing a movement point from a plurality of acquired detection points. In more detail, the object recognition section 278 recognizes the object B on the basis of the position coordinates of a stop point obtained by removing the position coordinates of a movement point from the position coordinates of a plurality of detection points acquired by the coordinate acquisition section 272.

In the detection of the object B using a motion stereo technique, the present embodiment can allow the own vehicle 10 to suitably avoid unnecessary vehicle control accompanying error detection caused by movement of the object B. For example, in cases of parking support or collision avoidance for the own vehicle 10, when a moving object, i.e., an oncoming vehicle, which the own vehicle 10 can safely pass by is erroneously detected as an obstacle that is likely to collide with the own vehicle, an unnecessary avoidance control or braking control is performed. The present embodiment, however, can suitably avoid the intervention of such an unnecessary avoidance control or braking control. Accordingly, the present embodiment can provide an object detection result that can suitably be used for vehicle controls.

In the present embodiment, the object recognition section 278 recognizes the object B on the basis of the result of calculating the position coordinates by the coordinate acquisition section 272 and the ranging information and the relative position information acquired by the ranging information acquisition section 277. Therefore, even if a moving object whose result of calculating the position coordinates has been deleted, i.e., cleared, approaches the own vehicle 10, an alert can be issued or a collision avoidance action control can be performed before the occurrence of a collision, by using, for example, the ranging information acquired by the ranging information acquisition section 277. Accordingly, the present embodiment enables a suitable vehicle drive support control.

In the present embodiment, the movement point specification section 275 sets the movement point specification range RM, whose shape is set according to the movement state amount of the object B in a motion state, in the direction in which the moving object is present with respect to the own vehicle 10. The object recognition section 278 recognizes the object B present around the own vehicle 10 on the basis of the position coordinates of a stop point specified by removing a movement point, the movement point being specified by the movement point specification section 275 by using the movement point specification range RM. Accordingly, the present embodiment can specify, with suitable precision, a movement point according to the movement state amount of the object B, and a stop point.

(Example of Actions)

Hereinafter, a specific example of actions corresponding to the above-described summary of actions of the present embodiment will be described with reference to a flow chart illustrated in FIG. 4. In the drawing, a "step" is simply abbreviated as "S".

Figure 4:
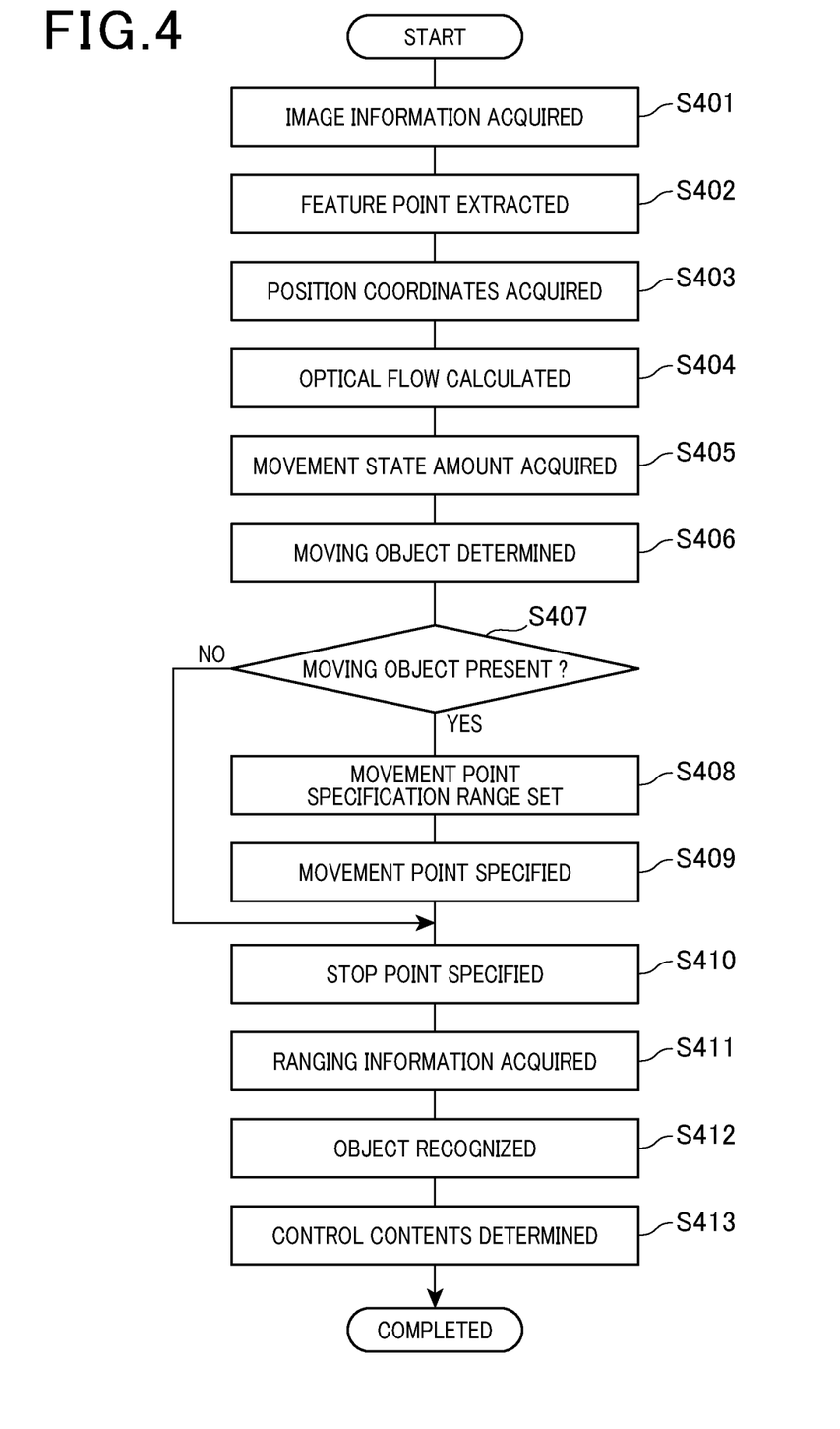
FIG. 4 is a flow chart illustrating the example of actions of the object detection device illustrated in FIG. 2.

The object detection device 20, i.e., the CPU of the object detection ECU 27, repetitively activates a routine illustrated in FIG. 4 at prescribed time intervals while prescribed activation conditions are satisfied. When the routine is activated, the object detection device 20 first executes processing of steps 401 to 407 sequentially.

In step 401, the object detection device 20 acquires image information by using the imaging section 21. In step 402, the object detection device 20 extracts feature points on the basis of the acquired image information. In step 403, the object detection device 20 acquires the position coordinates, i.e., the three-dimensional coordinates, corresponding to the feature points extracted in step 402.

In step 404, the object detection device 20 calculates an optical flow on the basis of a plurality of images captured at different positions of the own vehicle. In step 405, the object detection device 20 acquires a movement state amount corresponding to each of the feature points on the basis of the optical flow calculated in step 404. In step 406, the object detection device 20 determines the presence or absence of a moving object and the relative positional relationship between the moving object (when present) and the own vehicle 10 on the basis of the movement state amount acquired in step 405.

In step 407, the object detection device 20 determines the presence or absence of a moving object. When a moving object is present (that is, step 407=YES), the object detection device 20 executes processing of steps 408 and 409 and then continues to processing of step 410 and following steps.

In step 408, the object detection device 20 sets a movement point specification range RM. In step 409, the object detection device 20 specifies a movement point by using the set movement point specification range RM. In step 410, the object detection device 20 specifies a stop point. In this case, the stop point is specified by removing the movement point from a plurality of acquired detection points.

When a moving object is not present (that is, step 407=NO), the object detection device 20 skips the processing of steps 408 and 409 and continues to processing of step 410 and following steps. In step 410, the object detection device 20 specifies a stop point. In this case, almost all of the plurality of acquired detection points are specified as the stop points.

In step 411, the object detection device 20 acquires ranging information that is a result of detecting the distance by the sonar sensor 22. In step 411, the object detection device 20 also acquires information on a relative position of the object B with respect to the own vehicle 10 in the translational direction by triangulation based on the ranging information acquired using the plurality of sonar sensors 22.

In step 412, the object detection device 20 recognizes the object B on the basis of the result of acquiring the position coordinates in step 403, and the result of acquiring the ranging information and the relative position information in step 411. In step 413, the object detection device 20 determines the control contents on the basis of the result of recognizing the object B in step 412.

MODIFIED EXAMPLES

The present disclosure is not limited to the above embodiment. Therefore, the above embodiment can be modified as appropriate. Hereinafter, representative modified examples will be described. In the modified examples described below, differences from the above embodiment will be mainly described. Components that are identical or equal to each other between the above embodiment and the modified examples are assigned with the identical sign. Accordingly, in the modified examples described below, the description for the above embodiment can be applied as appropriate to a constituent element having a sign identical to that of the above embodiment, unless technical incompatibility or particularly additional description is noted.

The present disclosure is not limited to the specific device configuration illustrated in the above embodiment. That is, for example, the vehicle 10 to which the object detection device 20 is mounted is not limited to four-wheel automobiles. Specifically, the vehicle 10 may be a three-wheel automobile, or a six-wheel or eight-wheel automobile such as a cargo truck. The type of the vehicle 10 may be an automobile having only an internal-combustion engine, an electric automobile or a fuel cell vehicle having no internal-combustion engine, or a so-called hybrid automobile. The shape and the structure of the vehicle body 11 are not also limited to a box shape, that is, a substantially rectangular shape in a plan view. The number of door panels 17 is not also particularly limited.

The object to which the object detection device 20 is to be applied is not also particularly limited. That is, for example, the object detection device 20 is not limited to the application thereof to the drive support apparatus 50. Specifically, for example, the object detection device 20 can also favorably be applied to semi-automated driving or automated driving corresponding to levels 2 to 5 in the definition of automated driving.

The imaging section 21 is not limited to the example described above in terms of its position and number. That is, for example, the front camera CF may be disposed in the passenger compartment. Specifically, for example, the front camera CF may be attached to a room mirror (not illustrated) disposed in the passenger compartment of the vehicle 10. The left camera CL and the right camera CR may be disposed at positions different from the door mirror 18. Alternatively, the left camera CL and the right camera CR may not be provided.

The sonar sensor 22 is not limited to the specific example described above in terms of its position and number. That is, for example, with reference to FIG. 1, when the third front sonar SF3 is disposed at a central position in the vehicle width direction, the fourth front sonar SF4 is not disposed. Similarly, when the third rear sonar SR3 is disposed at a central position in the vehicle width direction, the fourth rear sonar SR4 is not disposed. The third side sonar SS3 and the fourth side sonar SS4 may not be disposed.

The various sensors used in the object detection device 20 are not limited to the vehicle speed sensor 24, the shift position sensor 25, the rudder angle sensor 26, and the like. That is, for example, at least one of the vehicle speed sensor 24, the shift position sensor 25, and the rudder angle sensor 26 may not be disposed or may be replaced with another sensor.

In the above embodiment, the object detection ECU 27 has a configuration in which the CPU reads a program from the ROM or the like and activates the program. The present disclosure, however, is not limited to the configuration. That is, for example, the object detection ECU 27 may have a configuration including a digital circuit, e.g., an ASIC or a FPGA, configured to enable the actions described above. ASIC is an abbreviation of Application Specific Integrated Circuit. FPGA is an abbreviation of Field Programmable Gate Array.

In the above embodiment, the object detection ECU 27 constitutes a main part of the object detection device 20. Therefore, the imaging section 21 to the rudder angle sensor 26, the display 28, and the voice output section 29 may be, in the above embodiment, regarded not as main constituent elements of the object detection device 20 but as additional elements of the object detection device 20. Alternatively, for example, at least the imaging section 21 as well as the object detection ECU 27 may be regarded as a main constituent element of the object detection device 20.

The present disclosure is not limited to the specific functional configuration and example of actions illustrated in the above embodiment. For example, the imaging section 21 and the sonar sensor 22 may be regarded as main constituent elements of the object detection device 20 that respectively constitute the image information acquisition section 270 and the ranging information acquisition section 277. Alternatively, at least one or all of the image information acquisition section 270 to the control content determination section 279 may be provided in the imaging section 21.

The processing contents of the coordinate acquisition section 272 are not limited to monocular motion stereo. Specifically, for example, multiocular stereo, or integrated processing of monocular motion stereo and multiocular stereo may be used. The integrated processing of monocular motion stereo and multiocular stereo has been publicly known or well-known at the time of filing of the present application. Accordingly, in the present specification, the processing of multiocular stereo and the integrated processing of monocular motion stereo and multiocular stereo are not described in detail.

The movement state amount acquisition section 273 may acquire a movement state amount by using the detection result of the sonar sensor 22 and/or the radar sensor 23 in place of or together with the optical flow.

The movement point specification section 275 may be configured to specify a movement point from feature points, the position coordinates of which have not been calculated by the coordinate acquisition section 272. Similarly, the stop point specification section 276 may be configured to specify a stop point from feature points, the position coordinates of which have not been calculated by the coordinate acquisition section 272. In this case, the coordinate acquisition section 272 calculates, by a motion stereo technique, the position coordinates of a stop point obtained by removing, from extracted feature points, a movement point that is a feature point corresponding to a moving object. That is, the coordinate acquisition section 272 acquires the position coordinates of a stop point obtained by removing a movement point from a plurality of acquired detection points, i.e., feature points. The object recognition section 278 recognizes the object B on the basis of the position coordinates of the stop point. Specifically, in the flow chart of FIG. 4, the processing of step 403 is performed after step 410. This processing order can realize high-precision calculation of the position coordinates while effectively reducing calculation load.

The ranging information acquisition section 277 may acquire ranging information on the basis of the output of the radar sensor 23 in place of or together with the output of the sonar sensor 22. That is, ultrasonic waves or electromagnetic waves may be used as the exploratory waves. In addition, a reflection point acquired by the radar sensor 23 may be used as the ranging point. In this case, the relative position information on the reflection point may be used as a replacement of the ranging point acquired by the sonar sensor 22. Alternatively, the relative position information on the reflection point may be used as a correction element of the ranging point acquired by the sonar sensor 22.

The data on the feature point and/or the position coordinates corresponding to the movement point that is not used for object recognition by the object recognition section 278 may be deleted, i.e., cleared. Alternatively, the data on the feature point and/or the position coordinates corresponding to the movement point may not be deleted but may be held to supply the data for another purpose or use by another ECU.

In the specific example described above, the action of detecting the object B using an image captured by the front camera CF has been described. The present disclosure, however, is not limited to this aspect. That is, for example, the present disclosure may also favorably be applied to an action of detecting the object B using an image captured by the rear camera CB. Similarly, the present disclosure may also favorably be applied to an action of detecting the object B using images captured by the left camera CL and the right camera CR.

In the above embodiment, an example of using three-dimensional coordinates as the position coordinates has been described. In this example, the "position coordinates" may also be referred to as "three-dimensional position coordinates" or "three-dimensional coordinates". The present disclosure, however, is not limited to this aspect. That is, for example, two-dimensional coordinates may be used as the position coordinates. Specifically, for example, the coordinate acquisition section 272 may detect, through the principle of triangulation by a motion stereo technique, the position coordinates in an XY two-dimensional coordinate system, with the center of gravity of the own vehicle 10 set to the origin, the vehicle width direction to the X-axis, the vehicle length direction to the Y-axis. Similarly, the movement state amount acquisition section 273 to the control content determination section 279 may be configured to function or act on the basis of the two-dimensional position coordinates.

The expression "acquisition" can be replaced as appropriate with similar expressions such as "estimation", "detection", "sensing", and "calculation" without technical incompatibility. The "detection" and the "extraction" can also be replaced with each other as appropriate without technical incompatibility. An inequality sign in the determination processing may be with or without an equality sign. That is, for example, the phrases "less than a threshold" and "a threshold or less" can be replaced with each other without technical incompatibility.

Needless to say, the elements constituting the embodiment are not necessarily essential except, for example, cases in which they are particularly clearly described as essential or clearly considered to be essential in principle. In addition, when the numerical values of the number, the amount, the range, and the like of the constituent elements are referred to, the present disclosure is never limited to the specified numerical values except, for example, cases in which they are particularly clearly described as essential or the present disclosure is clearly in principle limited to them. Similarly, when the shape, the direction, the positional relationship, and the like of the constituent elements and the like are referred to, the present disclosure is never limited to the specified shape, direction, positional relationship, and the like except, for example, cases in which they are particularly clearly described as essential or the present disclosure is clearly in principle limited to them.

The functional configurations and methods described above may be realized by a dedicated computer that is configured to include a memory and a processor programmed to execute one or a plurality of functions embodied by a computer program. Alternatively, the functional configurations and methods described above may be realized by a dedicated computer configured to include a processor consisting of one or more dedicated hardware logic circuits. Alternatively, the functional configurations and methods described above may be realized by one or more dedicated computers configured by a combination of a memory and a processor programmed to execute one or a plurality of functions, with a processor consisting of one or more hardware logic circuits. The computer program may be stored in a computer-readable non-transitory tangible storage medium as instructions executed by a computer. That is, the device or method according to the present disclosure can be expressed as a computer program including a procedure for realizing the functions or method described above, or as a non-transitory tangible storage medium that stores the program.

The modified examples are not also limited to the examples described above. A plurality of modified examples may be combined with each other. In addition, the entire or a part of the above embodiment may be combined with the entire or a part of the modified examples.

According to an aspect of the present disclosure, an object detection device (20) is configured to be mounted to an own vehicle (10) to detect an object (B) present around the own vehicle.

The object detection device includes:
a coordinate acquisition section (272) that acquires position coordinates of a detection point corresponding to the object on the basis of a plurality of images captured at different positions along with movement of the own vehicle by one imaging section (21) mounted to the own vehicle; and
an object recognition section (278) that recognizes the object without using position coordinates of a movement point that is a detection point corresponding to a moving object but using position coordinates of a stop point that is a detection point different from the movement point.

According to another aspect of the present disclosure, an object detection method is a method for detecting an object (B) present around an own vehicle (10), the method including a following procedure or processing:
acquiring position coordinates of a detection point corresponding to the object on the basis of a plurality of images captured at different positions along with movement of the own vehicle by one imaging section (21) mounted to the own vehicle; and
recognizing the object without using position coordinates of a movement point that is a detection point corresponding to a moving object but using position coordinates of a stop point that is a detection point different from the movement point.

According to another aspect of the present disclosure, a storage medium (27) is a medium in which an object detection program that is executed by an object detection device (20) configured to be mounted to an own vehicle (10) to detect an object (B) present around the own vehicle is stored to cause a computer (27) to execute processing, the processing including:
acquiring position coordinates of a detection point corresponding to the object on the basis of a plurality of images captured at different positions along with movement of the own vehicle by one imaging section (21) mounted to the own vehicle; and
recognizing the object without using position coordinates of a movement point that is a detection point corresponding to a moving object but using position coordinates of a stop point that is a detection point different from the movement point.

In the sections of the application document, elements may be assigned with a reference sign in parenthesis. In this case, the reference sign simply represents one example of the correspondence relationship between the element and a specific component described in the embodiment described above. Therefore, the present disclosure is not at all limited by the reference sign described.

What is claimed is:

1. An object detection device configured to be mounted to an own vehicle to detect an object present around the own vehicle and to perform parking support, the object detection device comprising:
a storage medium storing instructions; and
a processor connected to the storage medium, wherein, the processor executes the instructions to:
acquire position coordinates of a first detection point corresponding to the object on the basis of a plurality of images captured at different positions along with movement of the own vehicle by one imaging section mounted to the own vehicle;
acquire a movement state amount as a movement velocity or a movement distance of the object, and
specify the first detection point as a movement point corresponding to a moving object in response to the movement state having a value greater than a threshold and in response to the first detection point being present in a prescribed range set according to a relative positional relationship between the moving object and the own vehicle, wherein the prescribed range is set in a direction in which the moving object is present with respect to the own vehicle and wherein a shape of the prescribed range is set according to the movement state amount;
recognize a parking space and an obstacle without using position coordinates of the movement point corresponding to the moving object but using position coordinates of a stop point that is a second detection point corresponding to the moving object different from the movement point and that is detected based on the plurality of images;
calculate a control amount necessary for traveling a prescribed calculated route to the parking space while avoiding the obstacle; and
issue an alert or perform a collision avoidance action control using ranging information of the moving object acquired using one or more ranging sensors that are different from the one imaging section, the using of the ranging information including adjusting the position coordinates of the stop point based on the ranging information.

2. The object detection device according to claim 1, wherein
the processor acquires position coordinates of the stop point by removing the movement point from a plurality of acquired detection points, and
the processor recognizes the obstacle-on the basis of the position coordinates of the stop point.

3. The object detection device according to claim 1, wherein
the processor recognizes the obstacle-on the basis of position coordinates of the stop point obtained by removing the coordinates of the movement point from position coordinates of a plurality of acquired detection points.

4. The object detection device according to claim 1, wherein the processor acquires the movement state amount by using an optical flow calculated on the basis of the plurality of images captured at different positions of the own vehicle.

5. The object detection device according to claim 1, wherein the ranging information is acquired using one or more ultrasonic sensors.

6. An object detection method for detecting an object present around an own vehicle and for performing parking support, the object detection method comprising:
acquiring position coordinates of a first detection point corresponding to the object on the basis of a plurality of images captured at different positions along with movement of the own vehicle by one imaging section mounted to the own vehicle;
acquiring a movement state amount as a movement velocity or a movement distance of the object, and
specifying the first detection point as a movement point corresponding to a moving object in response to the movement state having a value greater than a threshold and in response to the first detection point being present in a prescribed range set according to a relative positional relationship between the moving object and the own vehicle, wherein the prescribed range is set in a direction in which the moving object is present with respect to the own vehicle and wherein a shape of the prescribed range is set according to the movement state amount;

recognizing a parking space and an obstacle without using position coordinates of the movement point corresponding to the moving object but using position coordinates of a stop point that is a second detection point corresponding to the moving object different from the movement point and that is detected based on the plurality of images;

calculating a control amount necessary for traveling a prescribed calculated route to the parking space while avoiding the obstacle; and issuing an alert or perform a collision avoidance action control using ranging information of the moving object acquired using one or more ranging sensors that are different from the one imaging section, the using of the ranging information including adjusting the position coordinates of the stop point based on the ranging information.

7. The object detection method according to claim 6, wherein the ranging information is acquired using one or more ultrasonic sensors.

8. A non-transitory computer-readable storage medium in which an object detection program that is executed by an object detection device configured to be mounted to an own vehicle to detect an object present around the own vehicle and to perform parking support is stored to cause a computer to execute processing, the processing comprising:

acquiring position coordinates of a first detection point corresponding to the object on the basis of a plurality of images captured at different positions along with movement of the own vehicle by one imaging section mounted to the own vehicle;

acquiring a movement state amount as a movement velocity or a movement distance of the object, and specifying the first detection point as a movement point corresponding to a moving object in response to the movement state having a value greater than a threshold and in response to the first detection point being present in a prescribed range set according to a relative positional relationship between the moving object and the own vehicle, wherein the prescribed range is set in a direction in which the moving object is present with respect to the own vehicle and wherein a shape of the prescribed range is set according to the movement state amount;

recognizing a parking space and an obstacle without using position coordinates of the movement point corresponding to the moving object but using position coordinates of a stop point that is a second detection point corresponding to the moving object different from the movement point and that is detected based on the plurality of images;

calculating a control amount necessary for traveling a prescribed calculated route to the parking space while avoiding the obstacle; and issuing an alert or perform a collision avoidance action control using ranging information of the moving object acquired using one or more ranging sensors that are different from the one imaging section, the using of the ranging information including adjusting the position coordinates of the stop point based on the ranging information.

9. The non-transitory computer-readable storage medium of claim 8, wherein the ranging information is acquired using one or more ultrasonic sensors.

\* \* \* \* \*